Dec. 28, 1948.  C. H. SPARKLIN  2,457,185
HEAT REGULATING IRON
Filed May 15, 1944  2 Sheets-Sheet 1

Inventor:
Charles H. Sparklin,
By Chritty, Wiley, Schroeder & Merriam,
Attys.

Dec. 28, 1948.  C. H. SPARKLIN  2,457,185
HEAT REGULATING IRON
Filed May 15, 1944  2 Sheets-Sheet 2
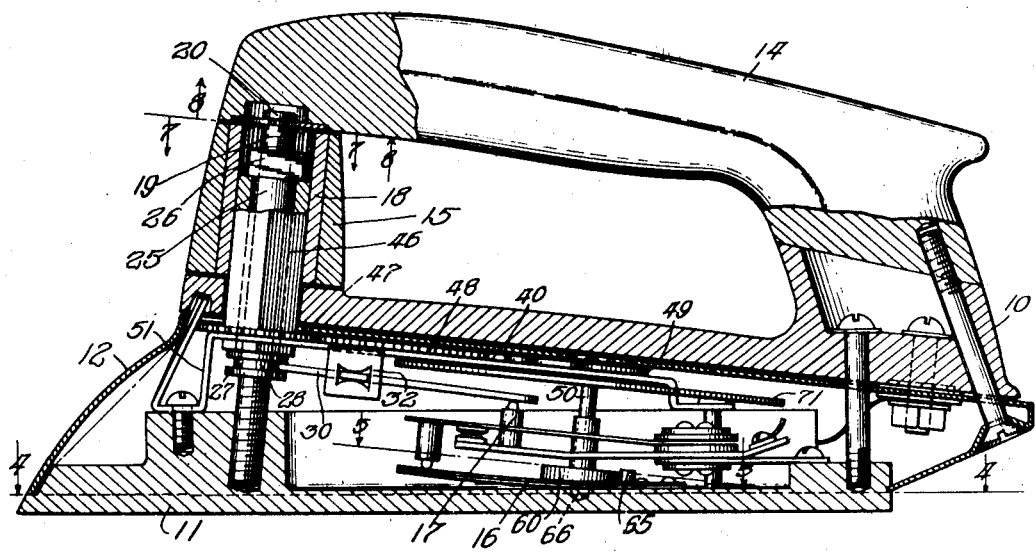
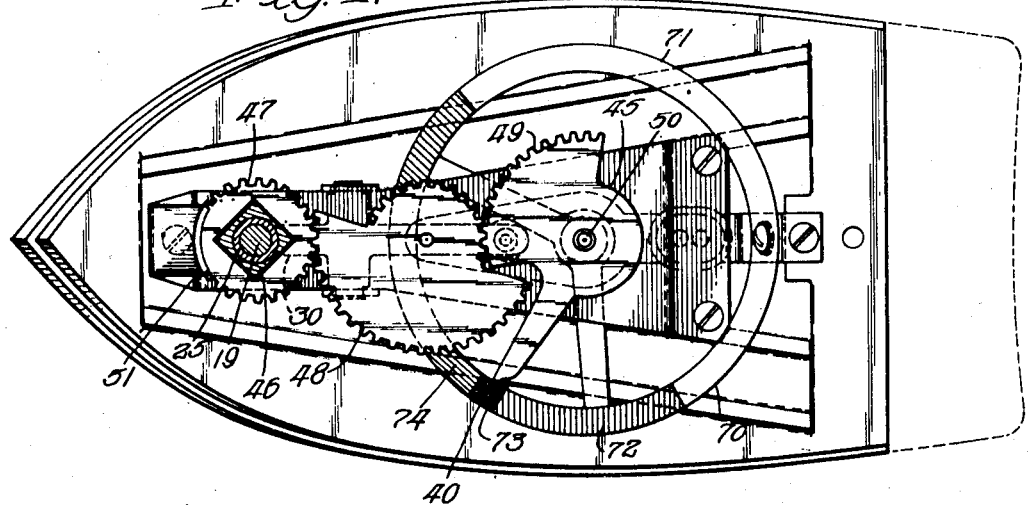
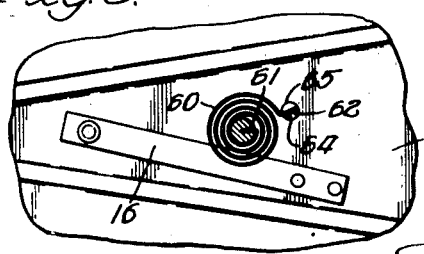
Inventor.
Charles H. Sparklin,
By Benton, Wiles, Schwier & Merriam,
Attys.

Patented Dec. 28, 1948

2,457,185

UNITED STATES PATENT OFFICE 2,457,185

HEAT REGULATING IRON

Charles H. Sparklin, Chicago, Ill., assignor to Birtman Electric Company, a corporation of Illinois Application May 15, 1944, Serial No. 535,645

11 Claims. (Cl. 38—74)

This invention relates to a heat regulating iron and more particularly to an electric sadiron in which setting indicating means are provided for indicating the setting of the thermostat at a point remote from the means for adjusting the same.

It is common practice in more expensive irons to provide adjustable thermostatic control for the iron which may be set for different operating conditions. For example, cotton, wool, silk, and rayon all require different temperatures of the iron for most effective ironing. It has heretofore been proposed to provide a thermostat with an adjustment which may be operated from a handle of the iron and which bears upon the handle calibrated indicia indicating each setting of the thermostat. In some instances this adjustment is mounted on the body of the iron.

Furthermore, in some irons thermometers have been employed showing the temperature conditions of the iron, but in no case has the thermostatic adjustment been positioned in a part of the iron convenient to the fingers while the indicia have been placed with an indicator in a portion of the iron more convenient to the eye; nor has any iron included superimposition of the setting indicator and the temperature indicator so that the operator may ascertain at a single glance how the actual temperature of the iron corresponds to the predetermined setting.

Figure 1:
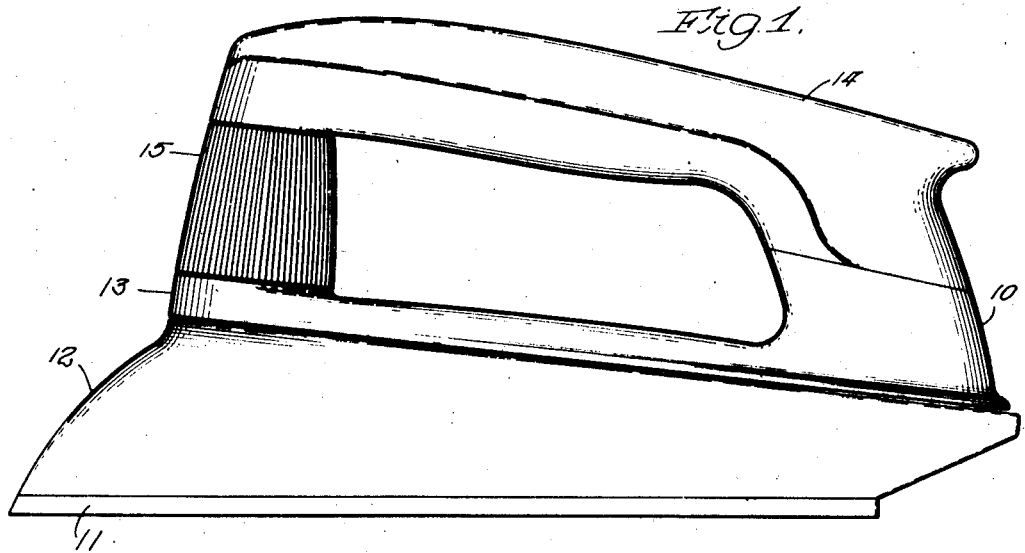
Figure 2:
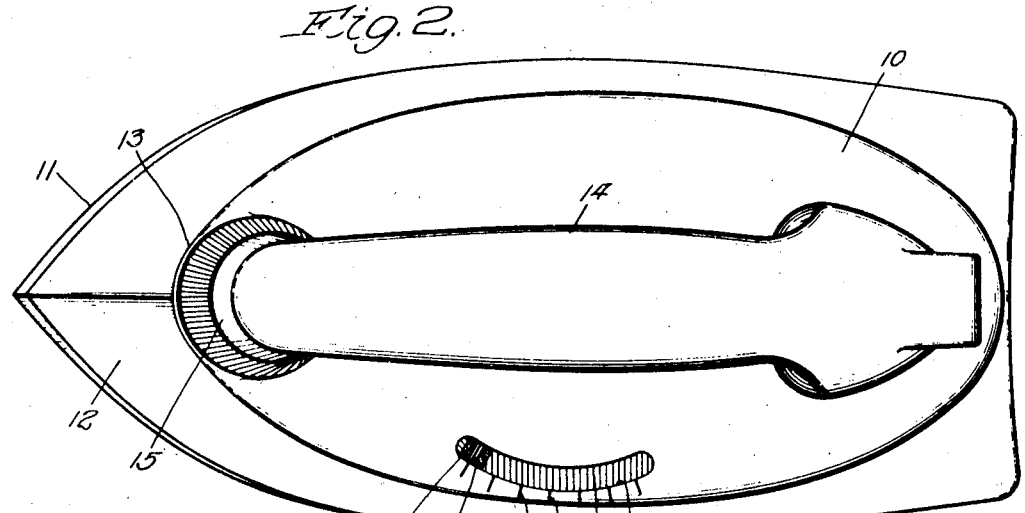
Figures 6, 7, 8:
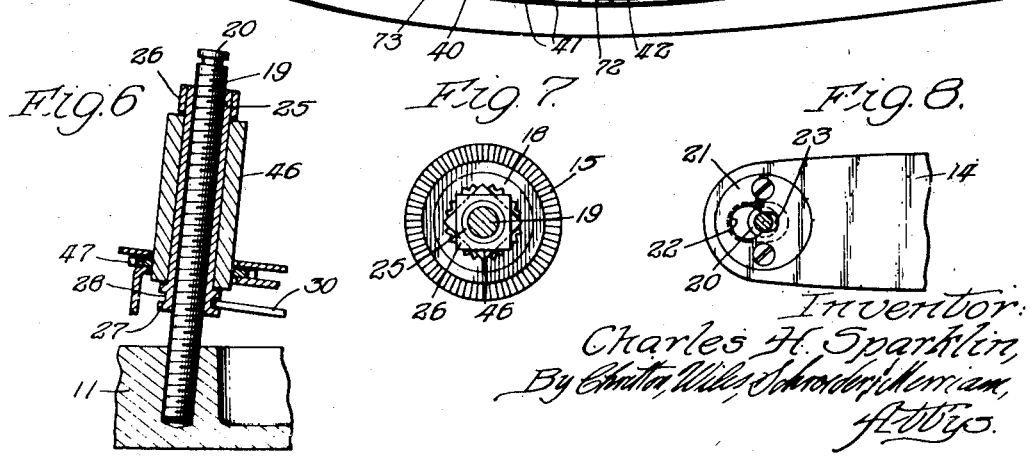

The invention is illustrated in the drawings, in which Figure 1 is a side elevation of the iron; Figure 2 is a plan view thereof; Figure 3 is a side elevation partly in section; Figure 4 is a sectional plan view taken along the line 4—4 in Figure 3; Figure 5 is a detailed plan view of the temperature recording thermostat taken along the line 5—5 in Figure 3; Figure 6 is a partial sectional elevation of the control for the setting indicator; Figure 7 is a sectional plan view taken along the line 7—7 in Figure 3; and Figure 8 is a sectional view looking upward on the line 8—8 in Figure 3.

As shown in the drawings, the iron 10 comprises a sole plate 11 and a hood 12 which together define the body portion of the iron, a handle support 13, a handle 14 supported thereon, and a control knob 15. The usual form of snap acting thermostat 16 is provided in the body of the iron and is affixed to the sole plate. The fixed contact of a switch operated by the thermostat for regulating the temperature of the iron may be adjusted by movement of the post 17. In the preferred form of the invention this adjustment is accomplished by rotation of the control knob 15 in the following manner. The knob 15, as shown in Figure 7, has a central opening in which an internal sleeve 18 is anchored. Within this sleeve is a threaded post 19 which is fastened in the sole plate at its bottom and which has a head 20 secured within a plate 21 (see Figure 8) in the handle. This plate has a key opening 22 which may be slipped over the head of the post 19, after which the handle is moved forward so that the slot 23 engages the head 20.

An elongated sleeve 25 is threaded upon the post 19 and is provided at its top with a square head 26 and at its base with a collar 27 having a groove 28. An arm 30 which is pivotally mounted in the bracket 32 is engaged at its front end by the sides of the slot 28. The rear end of the arm 30 bears against the post 17. The elongated sleeve 25 is surrounded by a square sleeve 46 extending between the head 26 and the collar 27. This square sleeve 46 and the head 26 are surrounded by the internal sleeve 18 which is provided with longitudinal grooves (Fig. 7). The edges of the head 26 and square sleeve 46 extend into some of these grooves as shown in Fig. 7. As a result, when the knob 15 is rotated the head 26 is correspondingly rotated, moving the sleeve 25 and the collar 27 upwardly or downwardly on the post 19. When the knob is turned in a clockwise direction, as shown in Figure 7, the thermostat setting is raised, and when it is turned in a counter-clockwise direction the thermostat setting is lowered.

The setting of the thermostat is shown by the indicator 40, the end of which points to the indicia 41 mounted below the handle. The end of the indicator 40 appears through an arcuate opening 42 in the body of the iron. In the particular form shown, this opening also passes through the handle support 13. The indicia 41 are marked for the suitable settings, usually ranging from cotton at the left to rayon at the right. The indicator 40 is operated synchronously with the setting of the thermostat 16 by means of a gear train 45 connected to the square sleeve 46 which is slidably mounted on the post 19 between the head 26 and the collar 27. A ring gear 47 having a square central opening is slidably mounted on the sleeve 46 and meshes with the larger circumference of a flat ring reducing gear 48. The smaller circumference of the gear meshes with the toothed arcuate member 49 pivoted on the shaft 50 and bearing the indicator 40.

It will thus be observed that as the knob 15 is turned in a counter-clockwise direction, as shown in Figures 7 and 4, the sleeve 46 is rotated in the same direction, carrying with it the ring gear 47 which rotates the reducing gear 48 in a clockwise direction and the arcuate member in a counter-clockwise direction, thus moving the indicator 40 to the right. The ring gear 47 slides upon the sleeve 46 as the latter is raised or lowered and is held in engagement with the reducing gear 48 by the support 51 below it and by the hood 12 above it. It will also be noted that the indicator 40 may be calibrated with the thermostat 16 before the knob 15 is placed in position. Then, regardless of the relative position of the sleeve 46 with respect to the head 26, this relative position will be maintained at all times by anchoring of the corners of the sleeve and the head in the notches on the inside of the knob.

The temperature indicator preferably comprises a thermostatic coil 60 secured to the sole plate of the iron in a central location, as shown in Figure 5. This coil may be of conventional bimetallic material and each end of the coil is sharply bent, the inner end 61 being bent inwardly, and the outer end 62 being bent outwardly. The outer end 62 is slidably carried within a slot 64 in the post 65 secured to the sole plate. The inner end 61 is slidably carried near the base of the post 50. The base 66 of the post 50 is rotatably journalled in the sole plate. As a result, when the temperature of the sole plate rises, the coil expands and turns the shaft 50 in a clockwise direction. The temperature indicating means 70 is secured to the neck of the shaft 50 and rotates therewith. This means comprises a ring 71 having its circumferential portion underlying the opening 42 and the point of the setting indicator 40. The ring 71 is painted appropriately, for example, with a red zone 72, a yellow zone 73, and a green zone 74, and is so calibrated that whenever the yellow zone underlies the setting indicator, the temperature of the iron is the temperature indicated by the setting indicator. On the other hand, when the red zone underlies the setting indicator, the temperature of the iron will be above that suitable for the particular operating conditions indicated, and when the green zone underlies the pointer, the temperature of the iron will be below that suitable for the preferred operating conditions. This calibration may be secured in any suitable way, either by applying the distinctive temperature indicia after testing of the iron, or by making the post 62 movable and adjusting it, or by mounting the ring 71 on the post 50 in such manner that it may be rotatably adjusted.

It will be observed that the operator has the knob 15 immediately adjacent to the thumb or first and second fingers and may operate the knob while the iron is in ironing position or upright in rest position. At the same time the setting indicator is at the more rearward and lower part of the iron so that the hand does not hide it, nor is it necessary for the operator to peer around the front of the iron in order to discover the setting of the iron. Above all, the operator may see at a single glance whether the iron is actually at the desired temperature setting, because unless the yellow zone on the ring 71 is immediately beneath the pointer 40, the iron is not at the right temperature. If the red zone shows, the iron is too hot; whereas, if the green zone shows, the iron is too cold.

The ability of the coil 60 to slide within two sockets or slots assists materially in maintaining accuracy, and in avoiding twisting of the coil under stress. The necessary small adjustments to avoid twisting strains are made by sliding movement in the slots.

The foregoing detailed description has been given for clearness of understanding only and no unnecessary limitations should be understood therefrom.

What I claim as new, and desire to secure by Letters Patent, is:

1. In a handle construction, a hand piece, a support therefor comprising a threaded post, a member threaded on said post to move along the axis of the post upon rotation relative to the post, a separate rotatable member operatively connected to said threaded member and also rotatable about the post, and means for confining the rotation of said separate rotatable member to a substantially fixed plane.

2. In a handle construction, a hand piece, a support therefor comprising a threaded post, a knob rotatably mounted around the post, a member threaded on said post and operatively engaged by the knob, said member being caused to move along the axis of the post upon rotation of said member by the knob relative to the post, a separate rotatable member independently carried by the post and operatively connected to the knob to rotate therewith, and means for confining the rotation of said separate rotatable member to a substantially fixed plane.

3. In a handle construction, a hand piece, a support therefor comprising a threaded post, a knob rotatably mounted around the post adjacent said hand piece, a rotatable member threaded on said post and operatively engaged by said knob, said member being caused to move along the axis of the post upon rotation of said member by the knob relative to the post, a second rotatable member independently carried by the post and operatively connected to the knob to rotate therewith, a separate rotatable member around the post and engaging the said second rotatable member to be rotated therewith, and means engaging said separate rotatable member to confine its rotation to a substantially fixed plane.

4. In a handle construction, a hand piece, a support therefor comprising a threaded post, a knob rotatably mounted around the post adjacent said hand piece, a rotatable member threaded on said post and operatively engaged by said knob, said member being caused to move along the axis of the post upon rotation of said member by the knob relative to the post, a second rotatable member independently carried by the post and operatively connected to the knob to rotate therewith, said second rotatable member being slidably mounted around said threaded member, a separate member slidably mounted on said second rotatable member and rotatable therewith, and means engaging said separate member for confining its rotation to a substantially fixed plane.

5. The handle construction of claim 4 wherein the knob is rotatable around the post in fixed position relative to the post, and the threaded member slidably engages said knob for movement relative thereto along the axis of the post.

6. In an electric iron including a heating means and having a handle and a body portion including a handle support below the handle, a thermostatically operated switch in the body, means for adjusting the thermostatically operated switch to predetermined settings corresponding to predetermined operating conditions of the iron, means convenient to the front of the handle for operating the adjusting means, and setting-indicating means remote from the adjusting means and located within the body of the iron at a point convenient to the eye of the user while manipulating the iron, with the setting-indicating means being visible through an opening in the body of the iron, said setting-indicating means being synchronously operatively connected to the adjusting means and being operable by the operating means, and said setting-indicating means being visible through the handle support.

7. An iron as set forth in claim 6, in which the adjusting means comprises a rotatable element adjacent the front of the handle, and setting-indicating means includes a gear train beneath the handle support connecting a pointer with said rotatable element, said pointer being spaced from the rotatable element.

8. An electric iron including a heating means and having a body portion and a handle above the body and a handle support forming a part of the body, an adjustable thermostatically operated switch within the body portion, a setting indicator within the body and beneath the handle support, means for adjusting the setting indicator for predetermined operating conditions of the iron, means for adjusting the thermostatically operated switch to corresponding settings, a vertical post carried by the body, a knob rotatably mounted on the post, and means carried by the post and operatively connected to both the thermostatically operated switch adjustment means and the setting-indicator adjustment means for synchronously operating both adjusting means upon rotation of the knob, said switch means and setting indicator adjustment means being located within the body and beneath the handle support.

9. An iron as set forth in claim 8, in which the means for synchronously operating the adjusting means includes a collar threaded on the post to move along a vertical axis upon rotation relative to the post, a separate rotatable member independently carried by the post and operatively connected to the knob to rotate therewith, a pivotally mounted arm carried in the collar having an adjusting member for said switch at one end thereof, and gear means connecting the separate rotatable member with the setting indicator, said gear means being located beneath the handle support.

10. In an electric iron including a heating means and having a body portion, a handle support and a handle supported thereby, a thermostatically operated switch in the body, means for adjusting the thermostatically operated switch to predetermined settings corresponding to predetermined operating conditions of the iron, and a visible setting indicating means for indicating the adjustment of said switch in terms of operating conditions of the iron; an annular knob rotatably mounted on an approximately vertical post between the body and handle to rotate upon a vertical axis and means within the knob operatively connected to the thermostatically operated switch and the setting indicator for synchronously adjusting the same.

11. An iron as set forth in claim 10, in which the means for synchronously adjusting the setting indicator and the thermostatically operated switch comprise a threaded post fixed in the base, a collar threaded thereon and having a portion fixed within the knob and a sleeve carried by the post above the collar.

CHARLES H. SPARKLIN.

REFERENCES CITED

The following references are of record in the file of this patent:

UNITED STATES PATENTS

| Number | Name | Date |
| --- | --- | --- |
| 1,450,995 | Turenne | Apr. 10, 1923 |
| 1,524,211 | Pritzker | Jan. 27, 1925 |
| 1,558,312 | Szent | Oct. 20, 1925 |
| 1,771,098 | Rider | July 22, 1930 |
| 1,798,854 | Satchwell | Mar. 31, 1931 |
| 1,930,062 | Rutenber | Oct. 10, 1933 |
| 1,937,058 | Fonseca | Nov. 28, 1933 |
| 1,976,854 | Mayer | Oct. 16, 1934 |
| 2,027,142 | Newell | Apr. 14, 1936 |
| 2,208,432 | Samuels | July 16, 1940 |
| 2,235,891 | Kuhn et al. | Mar. 25, 1941 |
| 2,277,034 | Bisley | Mar. 24, 1942 |
| 2,333,521 | Clark et al. | Nov. 2, 1943 |
| 2,342,653 | Edwards | Feb. 29, 1944 |